United States Patent [19]

Colledge

[11] 4,110,507
[45] Aug. 29, 1978

[54] BRANDED PLASTERBOARD PRODUCT

[76] Inventor: Gary C. Colledge, P.O. Box 2178, Newport Beach, Calif. 92663

[21] Appl. No.: 768,032

[22] Filed: Feb. 14, 1977

Related U.S. Application Data

[60] Continuation-in-part of Ser. No. 598,772, Jul. 24, 1975, Pat. No. 4,007,767, which is a continuation-in-part of Ser. No. 440,481, Feb. 7, 1974, abandoned, which is a division of Ser. No. 216,061, Jan. 7, 1972, Pat. No. 3,730,081.

[51] Int. Cl.² .......................................... B32B 21/06
[52] U.S. Cl. .................................. 428/151; 428/528; 428/529; 428/530; 428/531; 428/535; 428/537; 428/539
[58] Field of Search ............... 428/151, 528, 529, 530, 428/531, 535, 537, 539

[56] References Cited

U.S. PATENT DOCUMENTS 3,294,014  12/1966  Kneisel .................................... 101/8

Primary Examiner—Marion E. McCamish
Attorney, Agent, or Firm—Warren, Chickering & Grunewald

[57] ABSTRACT

A decoratively branded plasterboard product having a pattern of recesses formed in the paper-like outer surface of the plasterboard is disclosed. The recesses are charred to discolor the same, and the pattern is preferably a wood grain simulating pattern.

4 Claims, 2 Drawing Figures

BRANDED PLASTERBOARD PRODUCT

BACKGROUND OF THE INVENTION

1. Related Application

This application is a continuation-in-part application of my copending application Ser. No. 598,772, filed July 24, 1975, entitled "HIGH SPEED ROTARY BRANDING PROCESS HAVING INCREASED DIE LIFE," issued on Feb. 15, 1977 as U.S. Pat. No. 4,007,767. My copending application Ser. No. 598,772 is a continuation-in-part application based upon application Ser. No. 440,481, filed on Feb. 7, 1974 and entitled HIGH TEMPERATURE, LOW PRESSURE AND HIGH SPEED WOOD GRAIN EMBOSSING PROCESS, which application is now abandoned, but which application was in turn a divisional application of application Ser. No. 216,061, filed Jan. 7, 1972 and entitled HIGH SPEED, HIGH TEMPERATURE EMBOSSING MACHINE AND WHEEL THEREFOR, issued as U.S. Pat. No. 3,730,081 on May 1, 1973 with the title ROTARY HOT DIE EMBOSSER WITH TAPERED SHAFT AND INSULATED EMBOSSING WHEEL.

2. Prior Art

Highspeed rotary embossing apparatus have previously been devised which are particularly well suited for use in the embossing of relatively soft wooden molding for furniture, picture frames and the like. U.S. Pat. Nos. 3,730,081 and 3,764,767 typify such prior art apparatus, and the product produced therefrom is soft lumber with a deep coarse pattern branded therein.

In addition to embossing wood molding, it has long been desirable to be able to emboss a wood grain pattern on sheets or panels of wooden materials having poor grain characteristics. Such embossing of wooden panels has been accomplished to a limited degree by the apparatus of U.S. Pat. Nos. 2,703,463 and 2,695,857 which employ low temperature, low speed, high pressure processes. The resultant product is a relatively soft wooden panel, such as a plywood or the like.

The apparatus of U.S. Pat. Nos. 3,294,041 and 3,393,294 produce wood products having simulated wormholes therein. U.S. Pat. No. 2,202,110 teaches the use of hot blades to incise or cut soft woods such as Douglas fir.

In addition, cold dies have been employed with very substantial pressures to attempt to crush or impress a wood grain pattern into a wooden article. Even when relatively soft wood is employed, this approach results in chipping and fracturing of the wood fiber, poor grain definition, slow speed and inability of the impressed grain to visually stand out from the remainder of the wood with a corresponding need to use inks or color fillers to bring out the grain.

In addition to branding or embossing a pattern onto panels and molding, printing processes have been employed in which ink in imprinted onto the article in a wood grain pattern. In this process, the finish of the panel is controlled by the grain printer, and the manufacturer of the article must attempt to match other wood to the finish of the printed wood. Sanding or other refinishing of wood grain printed products is impossible.

Although there has been considerable effort in connection with attempts to upgrade wooden products having poor grain quality to products which have a desirable wood grain appearance, little or nothing has been done in connection with another common building material, namely, plasterboard. Plasterboard, sometimes called sheetrock and drywall, is formed as a sandwich of two paper or felt sheets which are bonded to a central hardened gypsum core. Plasterboard generally comes in relatively large sheets, for example, 1.2 × 2.4 meters and in thicknesses ranging from about 6 to 25 millimeters. Such plasterboard has been widely used for many years as a backing or substitute for plaster in the construction of residences, offices and numerous other buildings. While plasterboard does afford many advantages in building construction, one of its disadvantages is that it must always be covered by another material, such as paneling, paint, plaster, etc. The outside surfaces of the plasterboard are usually unacceptable as a final structural surface.

Essentially, therefore, the building industry has simply used plasterboard as a structural, and not a decorative, product. Thus, plasterboard is supplied to builders and the like with a plain, often gray, outer surface which is totally devoid of surface ornamentation, other than the manufacturer's trademark.

OBJECTS OF THE INVENTION

It is an object of the present invention to provide a new plasterboard product which can be employed as a decorative element in the construction of a wide variety of structures.

It is a further object of the present invention to provide a plasterboard product having a decorative wood grain pattern therein which can be stained or otherwise finshed to produce a wood panel simulating surface.

Another object of the present invention is to provide a branded plasterboard product which is durable, has improved versatility of use, and is inexpensive to manufacture.

Other objects and features of advantage of the branded plasterboard product of the present invention will become apparent from or are set forth in detail in the accompanying drawing and the following description of the preferred embodiment.

SUMMARY OF THE INVENTION

The branded plasterboard product of the present invention is comprised, briefly, of a sheet of plasterboard having at least one outwardly facing paper-like layer bonded to a gypsum based core, and a plurality of recesses formed in the paper-like layer to produce a pattern, with substantially all of the recesses being charred to discolor the appearance of the recesses as compared to the color of the paper-like layer intermediate the recesses. The recesses may be formed to a thickness greater than the paper-like layer and yet is continuous and unbroken over the area of the recesses.

DESCRIPTION OF THE PREFERRED EMBODIMENT

The product of the present invention has as its basic structural element a sheet of plasterboard, sometimes also referred to as "sheetrock" and "drywall". Plasterboard is formed with at least one outwardly facing paper-like layer which is bonded to a gypsum based core. As used herein, the expression "paper-like" shall include paper sheets, sheets made from paper and wood fiber, and felt sheets. The expression "gypsum based" shall also include other ceramic core materials.

Figure 1:
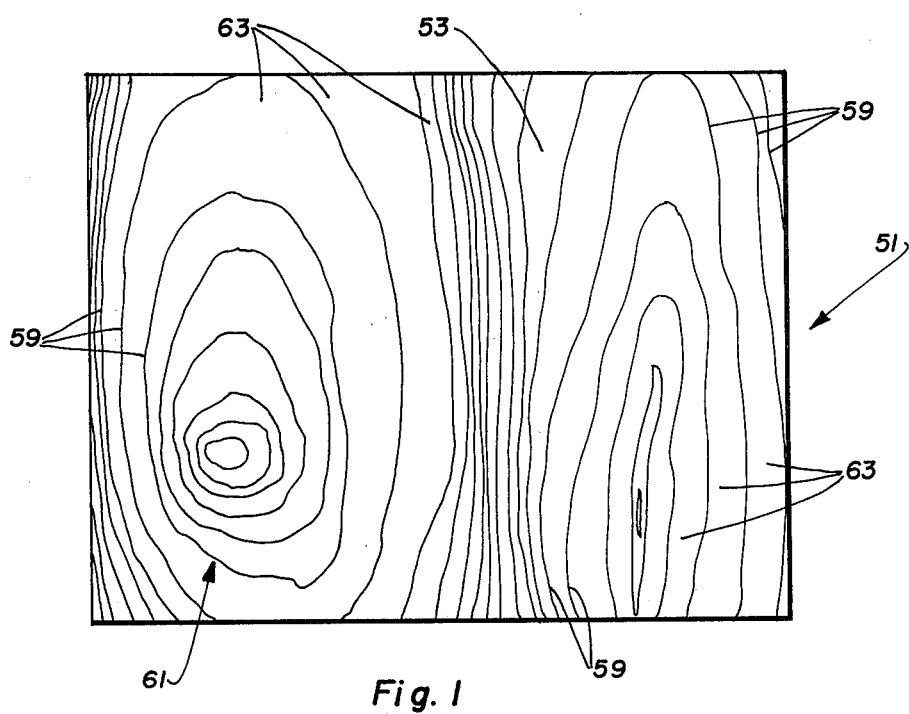
FIG. 1 is a top plan view of a branded plasterboard product constructed in accodance with the present invention.
Figure 2:
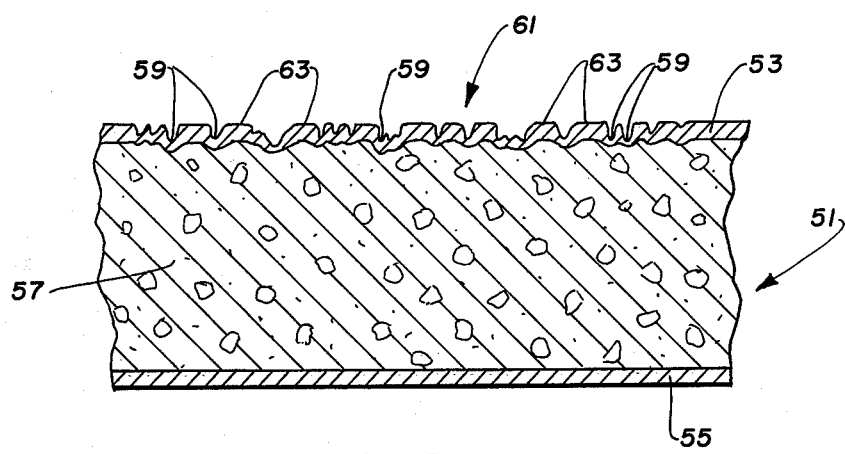
FIG. 2 is an enlarged, fragmentary, side elevational view, in cross-section, of the product of FIG. 1.

Referring now to FIGS. 1 and 2, a sheet, generally designated 51, of plasterboard material can be seen to include an upper paper-like layer 53 and a lower paper-like layer 55 surrounding gypsum based core 57. In order to provide a surface finish on sheet 51 which makes the product of the present invention usable as a decorative structural element, a plurality of recesses 59 are formed in paper layer 53 to produce a pattern, generally designated 61. Moreover, in order that the pattern be visually perceptible, substantially all of the recesses 59 are charred to discolor the appearance of the recesses as compared to the areas 63 of the paper-like layer intermediate the recesses. Since layers 53 and 55 are formed from a paper-like sheet, these layers can be branded by a hot die to cause the recesses 59 to become charred and discolored. The discoloration of the recesses causes them to stand out visually so that pattern 61 is readily discernible on the surface of the plasterboard.

The apparatus and method suitable for producing the product of the present invention are set forth in my above-referred to copending United States patent application. Briefly, the apparatus is comprised of a rotary branding or embossing machine which has a drum-like element on which is mounted an embossing die. The die is heated, preferably by resistance heating means mounted inside the drum proximate the die, to a temperature well above 500° F. As is indicated in my copending application, the temperature range for maximum life of dies having intricate grain patterns is between about 800° to about 900° F. The formation of charred recesses in the paper-like layer 53 of the plasterboard of the present invention is preferably accomplished by running the die at a temperature between about 800° to about 900° F, with a lineal speed of 50 feet per minute. Notwithstanding the fact that the plasterboard product of the present invention has an outer paper-like layer, the speed of embossing plasterboard is slower than would be employed to emboss ordinary lumber, hardboard, particleboard or fiberboard. If plasterboard is run at a speed substantially in excess of 50 feet per minute at temperatures in the 850° to 950° F range, the pattern will be embossed into the paper layer, but there will be no branding or discoloration of the recesses. It is hypothesized that production of the product of the present invention requires slower branding speeds in order to effect charring either as a result of the inherent qualities of the paper layer 53 or possibly in part due to the gypsum core 57 acting as a heat sink.

It is a further feature of the present invention that the product can be branded with recesses 59 having a depth greater than the thickness of the paper-like layer 53, without piercing or breaking the paper layer. Thus, the paper-layer 53 is formed as a continuous unbroken sheet over the area, including the recesses, on which the pattern is formed. The relative depth of the recesses as compared to the thickness of paper can best be seen in FIG. 2, and the continuous unbroken layer 53, although compressed at the areas of recesses 59, is important in that it prevents the plasterboard core from crumbling and sifting out through the paper layer. Such a depth of recess, as will be understood, requires some compression of core 57 proximate the recess, and because of its ceramic nature, inevitably would produce crumbling of the core material proximate the recesses.

Since plasterboard or sheetrock is conventionally employed in walls and often has wood paneling positioned over it, it is a feature of the present invention that the pattern 61 formed in the product of the present invention be a wood grain simulating pattern. Moreover, the paper layer 53 of the product of the present invention, after branding of the recesses 59 therein, can be colored to produce a wood simulating color. This is usually accomplished by staining the paper layer 53, with the charred recesses 59 having a color that is darker than the stain so as to take on the appearance of darker wood grain.

The rotary branding recesses 59 in the upper surface of plasterboard 51 can be combined with the simultaneous formation of a side marginal groove at the outer edge of the plasterboard panel. The groove can be formed to mate with a complementary shaped groove in the edge of an adjacent panel so that in addition to the decorative pattern branded on the plasterboard, a structural element can be simultaneously formed.

Although branding of the product of the present invention requires branding speeds which are somewhat slower than for the branding of lumber and composition board, the slow speed of branding may have the desirable side effect of reducing the likelihood of piercing or severing the paper layer, which as above indicated is highly desirable. Paper-like layer 53 is only embossed or permanently compressed during branding to form pattern 61, not severed or carved away. It may be that branding equipment will be devised which will enable branding through stainless steel dies or other techniques at higher temperatures, in which case the branding of plasterboard could be accomplished at higher speeds, so long as the higher speeds did not produce severing of paper layer 53.

The branded plasterboard produce of the present invention affords the builder a product having all of the structural, insulating and fire resistant capabilities of conventional plasterboard as well as a new decorative capability. Instead of putting up the plasterboard and then having to panel, paint, or plaster over the same, a builder can now fasten the plasterboard in place with nails or other conventional fasteners and then simply stain the branded surface to match surrounding woods. The resultant product has the appearance of a wood panel sheet, and the cost savings as compared to the use of wood paneling are dramatic.

What is claimed is:

1. A decorative plasterboard product including a sheet having at least one outwardly facing paper-like layer bonded to a gypsum-based core, wherein the improvement in said plasterboard product is comprised of:
    said paper-like layer being formed with a decorative pattern of recesses therein provided by a plurality of permanently compressed areas, said compressed areas of said paper-like layer being further charred to discolor their appearance to make said recesses forming said pattern visually perceptible, and said paper-like layer being formed as a continuous unbroken sheet over said pattern including said recesses.

2. The decorative plasterboard product as defined in claim 1 wherein,
    said recesses are formed to a depth which is greater than the thickness of said paper-like layer, and said paper-like layer and said gypsum-based core are both compressed at said recesses.

3. The decorative plasterboard product as defined in claim 1 wherein, said pattern of compressed areas is formed as an intricate wood grain pattern covering substantially the entire area of said sheet.

4. The decorative plasterboard product as defined in claim 3 wherein, said paper-like layer is colored to produce a wood simulating color; and said recesses in said colored paper-like layer are darker than said wood simulating color.

* * * * *